United States Patent [19]

Meyer zu Riemsloh

[11] 4,356,010

[45] Oct. 26, 1982

[54] FILTER APPARATUS HAVING FILTER ELEMENTS AND REVERSE-FLOW CLEANING MEANS

[75] Inventor: Heinz Meyer zu Riemsloh, Marl, Fed. Rep. of Germany

[73] Assignee: Intensiv-Filter GmbH & Co. KG, Velbert, Fed. Rep. of Germany

[21] Appl. No.: 166,736

[22] Filed: Jul. 7, 1980

[30] Foreign Application Priority Data

Feb. 7, 1980 [DE] Fed. Rep. of Germany ....... 3004453

[51] Int. Cl.³ .............................................. B01D 46/04
[52] U.S. Cl. .......................................... 55/302; 55/379
[58] Field of Search ......................... 55/293, 302, 379; 417/198

[56] References Cited

U.S. PATENT DOCUMENTS

| | | | |
|---|---|---|---|
| 3,073,097 | 1/1963 | Hallett et al. | 55/302 |
| 3,513,638 | 5/1970 | Young | 55/379 |
| 3,535,852 | 10/1970 | Hirs | 55/379 |
| 3,765,152 | 10/1973 | Pausch | 55/302 |
| 3,874,857 | 4/1975 | Hunt et al. | 55/302 |
| 3,893,833 | 7/1975 | Ulvestad | 55/293 |
| 3,963,467 | 6/1976 | Rolschau | 55/302 |
| 4,073,632 | 2/1978 | Reinauer et al. | 55/379 |
| 4,149,828 | 4/1979 | Affri | 419/198 |

FOREIGN PATENT DOCUMENTS 17895 10/1902 Sweden ................................ 55/302

*Primary Examiner*—David L. Lacey
*Attorney, Agent, or Firm*—Martin A. Farber

[57] ABSTRACT

A filter apparatus comprising filter elements and reverse-flow cleaning means for the gas filter elements. The gas filter elements can be filter bags, filter pouches or filter cells. The reverse-flow means comprises a two-stage injector for drawing-in clean gas in two stages associated with each filter element by pulses of scavenging gas which are injected into the filter element in the direction opposite that of the filter flow. In order that large quantities of scavenging air for the cleaning of the filter elements can be produced in a small space, the first stage is formed as a Coanda annular slot injector and the second stage is formed as an inlet nozzle. The highest possible kinetic energy in the outlet jet of the first stage is obtained by forming the injector tube of this stage as a cylindrical outlet tube.

10 Claims, 2 Drawing Figures

FILTER APPARATUS HAVING FILTER ELEMENTS AND REVERSE-FLOW CLEANING MEANS

The present invention relates to a cleaning device with reverse-flow means for gas filter elements of dust-laden gas filters such as filter bags, filter pouches or filter cells, in which a two-stage injector for drawing in purified gas in two stages is associated with each filter element for the cleaning thereof by means of pulses of scavenging gas which are injected in counter-current into the filter element.

Cleaning devices for gas filter elements having single-stage injectors are known. However, they have the disadvantage of a comparatively small amount of scavenging air for the cleaning of the filter elements. Furthermore, two-stage injectors are also known for the cleaning of gas filter elements (German Pat. No. 12 28 130), but they however employ in the first and second stages central injectors which also do not produce any substantially higher quantities of scavenging air.

The object of the present invention is to provide an improved cleaning device with which large quantities of scavenging air for the cleaning of the filter elements are produced in a small space.

This object is achieved in accordance with the invention in the manner that the first stage is formed as a known "Coanda" annular-slot injector (14) and the second stage is formed as an inlet nozzle (11).

The advance in the art which can be obtained with the invention is based on various advantages: In the Coanda annular-slot nozzle the stream of primary air emerges radially from the annular slot, is guided along the curved wall, and is deflected into the axial direction. The primary stream in this connection transfers its momentum to the secondary stream which is located on the inside. This phenomenon is known as the "Coanda" effect.

A substantially higher scavenging capacity for the cleaning of filter elements is obtained with the two-stage injector. At the same time the amount of compressed air is reduced and thus the energy loss is less. The inlet nozzle, which is designed for high throughputs permits the further feeding of secondary air into the filter element. This air is conducted between injector outlet of the first stage and injector inlet of the second stage, in addition into the filter element. The pressure required for the cleaning of the filter elements is built up in this case only in the second stage. Another advantage is that mass flow ratios of 9/8:1 can be obtained.

With only a slight consumption of compressed air, large quantities of scavenging air can be obtained for the cleaning of the filter elements. However, the purified gases in the filter phase flow through the inlet nozzle (11) directly to the outlet (10), by-passing the first injector tube (18), and therefore need not flow through the relatively narrow first injector stage 14.

Other essential advantages of the invention are set forth below.

A maximum volumetric flow with high outlet velocity and thus the highest possible kinetic energy in the outlet jet of the first stage is obtained in the manner that the injector tube of the first stage is formed as cylindrical outlet tube (18) of a circular cross section which is constant over its entire length.

In order to intensify the pressure build-up in the second stage the inlet nozzle (11) of the second stage is formed as a cylindrical central injector having a circular cross section which is constant over its entire length.

In order to obtain an optimum pressure increase and thus the best possible volumetric throughput for the size and filter surface area of different filters, the cross sectional ratio of the cylinrical outlet tube (18) of the first stage to the cylindrical inlet nozzle (11) of the second stage can be changed by replacing the cylindrical inlet nozzle (11).

Space is saved in the manner that the inlet nozzle (11) is integrated into the filter element and at its inlet forms a radius portion (12) curving outwardly into the purified gas space (4) by which it is replaceably fastened to the supporting basket (e.g. note upper flange 28 of the supporting basket) for the filter element (6).

So that the filtration stream emerging from the filter elements is discharged over the cylindrical wall surface between the first and second stages and does not pass through the narrow first stage, the outlet end of the first stage is spaced from the inlet end of the second stage.

This spacing is advantageously equal to one to two times the inner diameter of the outlet tube (18) of the first stage.

One embodiment of the invention is shown by way of example in the drawing, in which.

Figure 1:
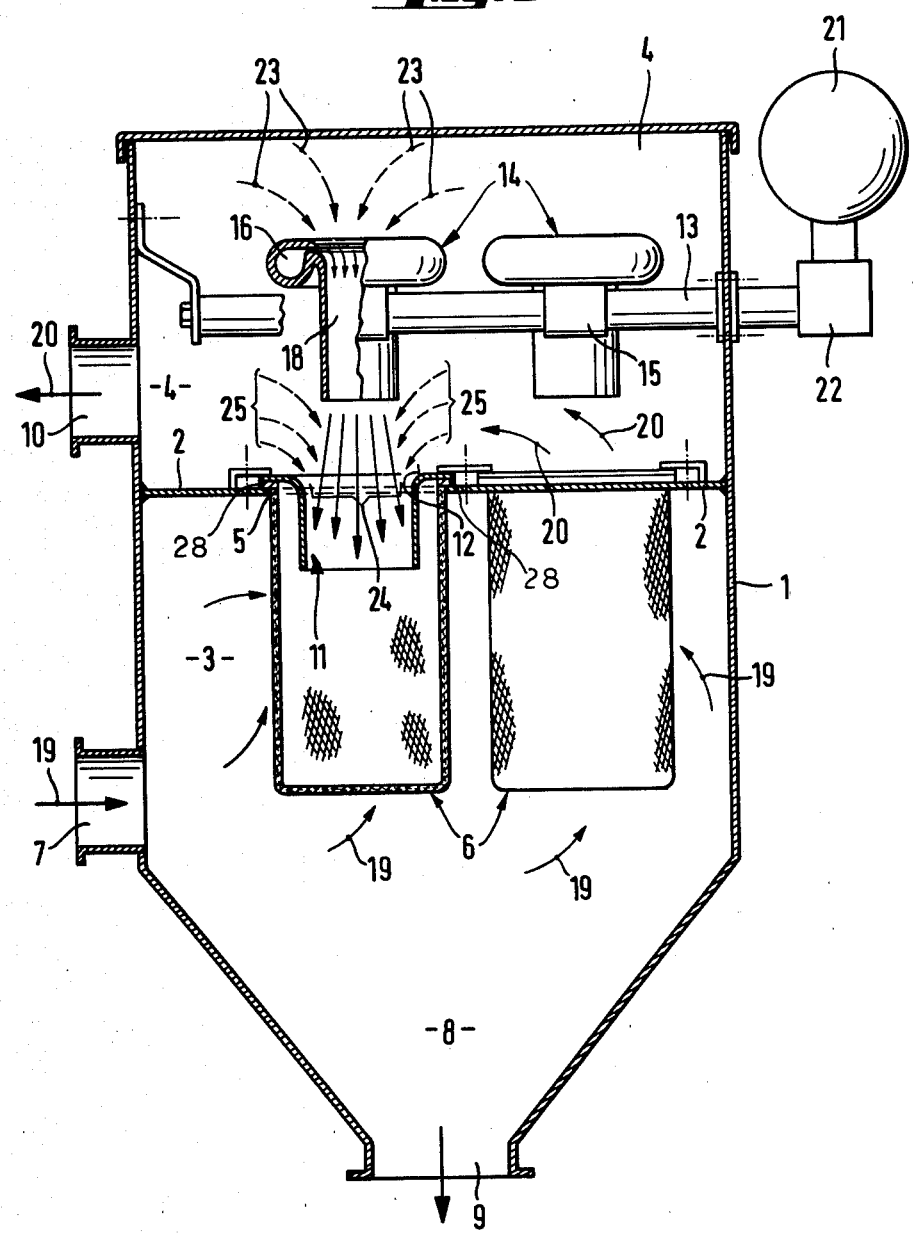
FIG. 1 shows a front view of the apparatus, in longitudinal section.
Figure 2:
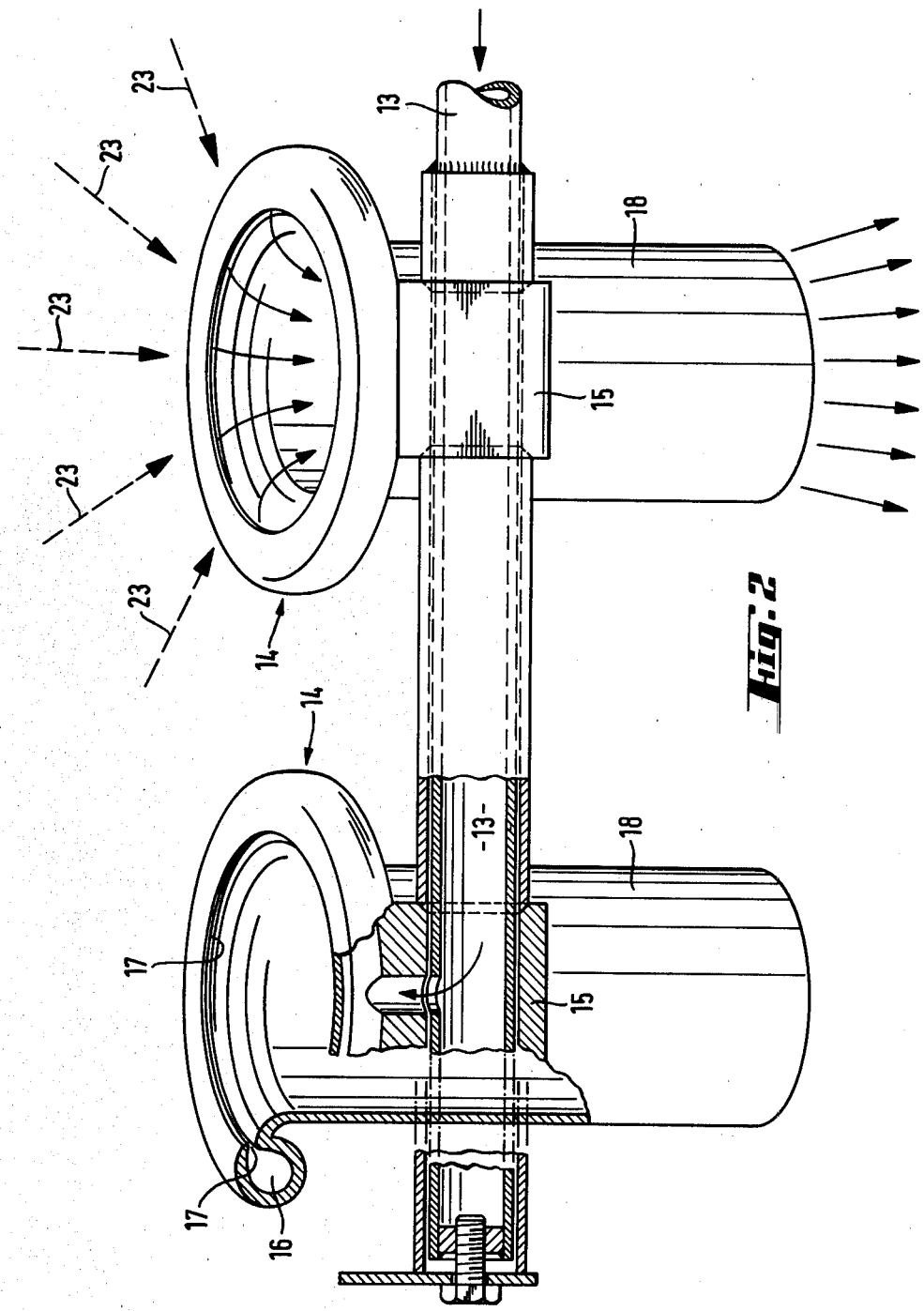
FIG. 2 shows the first injector stage with the feeding of compressed air in perspective view.

The apparatus in accordance with the invention comprises a housing 1 which is separated by a separating plate 2 into a crude-gas chamber 3 and a purified-gas chamber 4. In the separating plate 2 there are provided a number of circular openings 5 equal to the number of filter elements 6.

The crude-gas chamber 3 of the housing 1 is provided with a crude-gas inlet 7 for the dust-laden crude gas and with a dust outlet 9 for removal of the dust which has been filtered out.

The purified-gas chamber 4 has a purified-gas outlet 10 for the purified gas. Filter elements 6 are suspended in the circular openings 5.

An inlet nozzle 11 is arranged coaxial to the opening of each filter element 6. Each inlet nozzle 11 at its inlet defines a radius portion 12 whose curvature is directed outwardly into the purified-gas chamber 4.

Within the purified-gas chamber 4, annular-slot injectors 14 having connecting sockets 15 are arranged on the compressed-air feed conduit 13. The annular slot injector 14 is formed with an annular channel 16 which continues radially inwardly into an annular slot 17 referred to as a Coanda nozzle. This slot 17 is smaller than 1 mm and leads radially inwardly to a cylindrical outlet tube 18 of the annular slot injector 14.

The apparatus in accordance with the invention operates in the following manner:

The dust-laden crude gas 19 is conducted, in order to remove the dust from the crude gas, through the crude gas inlet 7 into the crude gas chamber 3 and then flows against the outside of the filter elements 6 passing through and into them. In this way, the dust particles in particular adhere to the outer sides of the filter elements 6.

The purified gas is conducted through the cylindrical inlet nozzles 11 into the purified gas chamber 4 and from there out of the purified gas outlet 10.

The filter elements 6 are cleaned at certain time intervals of 50 to 300 seconds during the filtration process by gas under pressure. For this purpose the pressurized gas is blown, in a direction opposite the direction of flow of the purified gas 20 simultaneously into the filter elements 6 of one row.

The pressurized gas necessary for the cleaning is produced by a pressure-gas compressor (not shown) and fed to the pressurized gas container 21. Within the pressurized gas container 21 there is a pressure of 6 bars. By opening the magnetically controlled diaphragm valves 22 corresponding to a row of filter elements 6 to be cleaned, a pressure gas pulse is then produced for a fraction of a second, via the series connected annular slot injectors 14, into the injector tubes 18.

The pressure-gas flow passes through the Coanda annular slot nozzles 14 into the injector tubes 18 of the first injector stage and entrains secondary gas 23 into the first injector stage. The total quantity of scavenging gas 24, consisting of primary and secondary scavenging gas, is forced via the inlet nozzle 11 suddenly into the filter elements 6 and entrains in addition a second quantity of secondary air 25 suddenly into the filter elements 6. Here, there builds-up a pressure suitable for the cleaning of the filter elements 6.

This cleaning by means of pressurized gas performs the following three functions:

1. The normal filtration flow is interrupted for a short time;
2. the filter element 6 is suddenly blown upon in reverse direction by the pressurized gas stream 24; and
3. the layer of dust which has deposited on the filter material of filters 6 is blown off by the primary stream of pressurized gas and the additionally double drawn in secondary scavenging gas streams 23 and 25.

The layer of dust which is removed in this way from the filter elements 6 is collected in the dust collection bin 8 and discharged from the latter via the outlet 9. After closing the magnetically controlled diaphragm valves 22 the normal filtration flow for the cleaned filter elements 6 again commences.

I claim:

1. In a filter apparatus comprising a housing having a dust-laden gas inlet, a clean gas outlet, a dust-laden chamber, a purified gas chamber, and having therein a plurality of gas filter elements for cleaning gas flowing therethrough between the dust-laden gas chamber and the purified gas chamber and a cleaning device including reverse-flow means for purging the gas filter elements, the reverse-flow means, comprising a two-stage injector for the drawing in of secondary purified gas from the purified gas chamber in two stages, respectively, which is positioned and arranged with respect to each filter element for the cleaning of the latter by means of pulses of scavenging gas which are injected in counter-current into each filter element, the improvement in the reverse-flow means wherein the two-stage injector for each said filter element comprises a pair of injectors for said each filter element comprising,
a first stage injector comprising an annular slot nozzle and positioned and arranged in the purified gas chamber to inject therethrough the scavenging gas and draw therein the secondary purified gas, and a second stage injector comprising an inlet nozzle positioned and arranged with respect to said annular slot nozzle and each said filter element so as to communicate substantially exclusively with said annular slot nozzle and with said each filter element to inject therethrough the scavenging gas and the secondary purified gas from said annular slot nozzle as well as to draw therein additional amounts of the secondary purified gas.

2. The filter apparatus according to claim 1, wherein said first stage injector includes an injector tube communicating with said annular slot nozzle, said injector tube is formed as a cylindrical outlet tube of a circular cross-section, said cross-section is constant over the entire length of said injector tube.

3. The filter apparatus according to claim 1 or 2, wherein
said inlet nozzle of said second stage injector is formed as a cylindrical central injector having a circular cross-section, said cross-section is constant over the entire length of said central injector.

4. The filter apparatus according to claim 2, wherein
said inlet nozzle of said second stage injector is formed as a cylindrical central injector having a circular cross-section, said cross-section is constant over the entire length of said central injector,
said inlet nozzle is replaceably mounted such that the cross-sectional ratio of the cylindrical outlet tube of said first stage injector relative to the inlet nozzle of said second stage injector can be changed by replacing said inlet nozzle.

5. The filter apparatus according to claim 1, further comprising
a filter separation plate separates said purified gas chamber from said dust-laden chamber,
each of said inlet nozzles is positioned in said each filter element and has an inlet portion defining an inlet and forming thereat a radius portion curving outwards into the purified gas chamber,
support basket means for supporting said each filter element,
said inlet nozzle is replaceably fastened to said support basket means by said radius portion.

6. The filter apparatus according to claims 1 or 5, wherein
said inlet nozzle is spaced axially apart from and coaxial to said first stage injector and coaxially mounted in said each filter element.

7. The filter apparatus according to claim 6, wherein
said inlet nozzle has a diameter larger than an outlet diameter of said first stage injector and an axial length substantially shorter than said each filter element.

8. The filter apparatus according to claim 5, wherein
said radius portion extends radially outwardly in a coplanar annular end portion, said support basket means is attached to said end portion.

9. The filter apparatus according to claim 1, wherein an outlet end of said first stage injector is spaced from an inlet end of said second stage injector.

10. The filter apparatus according to claim 9, wherein,
said first stage injector includes an outlet tube having said outlet end,
the spacing of said outlet end from said inlet end of said second stage injector is equal to one to two times the inner diameter of said outlet tube of said first stage injector.

* * * * *